(12) United States Patent
Fujishiro (10) Patent No.: US 12,089,281 B2
(45) Date of Patent: Sep. 10, 2024

(54) RADIO TERMINAL AND BASE STATION

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/175,435

(22) Filed: Feb. 27, 2023

(65) Prior Publication Data

US 2023/0209641 A1    Jun. 29, 2023

Related U.S. Application Data

(63) Continuation of application No. 17/132,660, filed on Dec. 23, 2020, now Pat. No. 11,612,011, which is a continuation of application No. PCT/JP2019/024936, filed on Jun. 24, 2019.

(30) Foreign Application Priority Data

Jun. 28, 2018   (JP) .................................. 2018-122950

(51) Int. Cl.
*H04W 76/27* (2018.01)
*H04W 76/30* (2018.01)

(52) U.S. Cl.
CPC ........... *H04W 76/27* (2018.02); *H04W 76/30* (2018.02)

(58) Field of Classification Search
CPC ....... H04W 76/27; H04W 76/30; H04W 8/26; H04W 74/006; H04W 76/11; Y02D 30/70
See application file for complete search history.

(56) References Cited

U.S. PATENT DOCUMENTS

| | | | |
|---|---|---|---|
| 11,751,271 B2* | 9/2023 | Jin | H04W 80/08 |
| | | | 370/329 |
| 2003/0003895 A1 | 1/2003 | Wallentin et al. | |
| 2014/0233538 A1 | 8/2014 | Zhang et al. | |
| 2015/0139153 A1 | 5/2015 | Zhang et al. | |
| 2017/0099677 A1 | 4/2017 | Farkas et al. | |

(Continued)

FOREIGN PATENT DOCUMENTS

| | | |
|---|---|---|
| WO | 2017-052320 A1 | 3/2017 |
| WO | 2018/064367 A1 | 4/2018 |

OTHER PUBLICATIONS

3GPP TSG RAN Meeting #80, RP-181186, Scope of Rel-16 LTE-MTC, Ericsson, Jun. 11-14, 2018, La Jolla, US.

(Continued)

*Primary Examiner* — Will W Lin
(74) *Attorney, Agent, or Firm* — Studebaker & Brackett PC (57) ABSTRACT

A user equipment, method used in a user equipment, and apparatus controlling a user equipment receive an RRC (Radio Resource Control) Release message when the user equipment is in an RRC connected state. The RRC Release message includes information indicating an uplink radio resource used for transmitting uplink data from the user equipment in an RRC inactive state. The user equipment, method, and apparatus control, in response to receiving the RRC Release message, the user equipment to transition from the RRC connected state to the RRC inactive state. The user equipment, method, and apparatus transmit the uplink data by using the uplink radio resource indicated by the information included in the RRC Release message when the user equipment is in the RRC inactive state.

3 Claims, 8 Drawing Sheets

(56) References Cited

U.S. PATENT DOCUMENTS

| | | | |
|---|---|---|---|
| 2017/0366236 A1 | 12/2017 | Ryoo et al. | |
| 2018/0270803 A1 | 9/2018 | Kwak et al. | |
| 2019/0052435 A1* | 2/2019 | Martin | H04W 76/27 |
| 2019/0320488 A1 | 10/2019 | Mildh et al. | |
| 2020/0037345 A1* | 1/2020 | Ryoo | H04W 76/27 |
| 2020/0169922 A1* | 5/2020 | Ozturk | H04W 36/0033 |
| 2020/0178113 A1* | 6/2020 | Jin | H04W 76/11 |
| 2020/0374968 A1* | 11/2020 | Sun | H04L 5/00 |

OTHER PUBLICATIONS

ZTE; "Remaining issues for EDT"; 3GPP TSG-RAN WG2; #100; R2-1712982; Nov. 27-Dec. 1, 2017; pp. 1-8; Reno, Nevada, USA.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; 3GPP TS36.300 V15.2.0; Jun. 2018; pp. 1-356; Release 15; 3GPP Organizational Partners.

3rd Generation Partnership Project; Technical Specification Group Radio Access Network; Evolved Universal Terrestrial Radio Access (E-UTRA); Radio Resource Control (RRC); Protocol specification; 3GPP TS36.331 V15.1.0; Mar. 2018; pp. 1-892; Release 15; 3GPP Organizational Partners.

Samsung; "Discussion on NoMA related procedure"; 3GPP TSG-RAN WG1 Meeting #93; R1-1806753; May 21-25, 2018; pp. 1-7; Busan, Korea.

Ericsson; "Remaining issues on early data transmission"; 3GPP TSG-RAN WG2 #101; R2-1805177; Apr. 16-20, 2018; pp. 1-5; Sanya, P.R. of China.

Kyocera; "Padding issue of EDT in eFeMTC and FeNB-IoT"; 3GPP TSG-RAN WG2 #101; R2-1803417; Feb. 26-Mar. 2, 2018; pp. 1-3; Athens, Greece.

Huawei; "UL data transmission without RRC signalling without initiating transition to active (option A)"; 3GPP TSG-RAN NR Adhoc; R2-1700185; Nov. 14-18, 2016; pp. 1-25; Spokane (WA), USA.

Objectives for Rel-16 NB-IoT and LTE-M(eMTC), pp. 1-42, (Year 2018).

* cited by examiner

RADIO TERMINAL AND BASE STATION

RELATED APPLICATIONS

This application is a Continuation of U.S. patent application Ser. No. 17/132,660 filed Dec. 23, 2020, which is a continuation based on PCT Application No. PCT/JP2019/024936, filed on Jun. 24, 2019, which claims the benefit of Japanese Patent Application No. 2018-122950 filed on Jun. 28, 2018. The content of which is incorporated by reference herein in their entirety.

TECHNICAL FIELD

The present disclosure relates to a radio terminal and a base station used for a mobile communication system.

BACKGROUND ART

In a mobile communication system conforming to the 3GPP (3rd Generation Partnership Project) standard, a radio terminal performs a random access procedure as a procedure to transition from a standby state called an RRC idle mode to a connected state called an RRC connected mode. After transitioning to the connected state through the random access procedure, the radio terminal transmits and receives user data to/from a base station.

As a technique for machine type communication, early data transmission has been introduced, in which user data is transmitted and received during the random access procedure. With the early data transmission, the radio terminal transmits uplink data to the base station using a message3 (Msg3) of the random access procedure and completes the random access procedure without transitioning to a connected state, thus enabling data transmission with low power consumption.

In order to further reduce signaling between the base station and the radio terminal, a technique eliminating the need for message1 (Msg1) and message2 (Msg2) in the random access procedure has been proposed (see Non Patent Literature 1). Msg1 is a random access signal (random access preamble) transmitted from the radio terminal to the base station, while Msg2 is a random access response transmitted from the base station to the radio terminal. In that novel technique, the radio terminal would start the random access procedure with the transmission of Msg3.

SUMMARY

A user equipment according to the present disclosure comprises a receiver, controller, and transmitter. The receiver is configured to receive an RRC (Radio Resource Control) Release message when the user equipment is in a RRC connected state, the RRC Release message including information indicating an uplink radio resource used for transmitting uplink data from the user equipment in an RRC inactive state. The controller is configured to, in response to receiving the RRC Release message, control the user equipment to transition from the RRC connected state to the RRC inactive state. The transmitter is configured to transmit the uplink data by using the uplink radio resource indicated by the information included in the RRC Release message when the user equipment is in the RRC inactive state.

A method used in a user equipment according to the present disclosure comprises receiving an RRC (Radio Resource Control) Release message when the user equipment is in an RRC connected state, the RRC Release message including information indicating an uplink radio resource used for transmitting uplink data from the user equipment in an RRC inactive state. The method comprises controlling, in response to receiving the RRC Release message, the user equipment to transition from the RRC connected state to the RRC inactive state. The method comprises transmitting the uplink data by using the uplink radio resource indicated by the information included in the RRC Release message when the user equipment is in the RRC inactive state.

An apparatus controlling a user equipment according to the present disclosure comprises a processor and a memory coupled to the processor. The processor is configured to receive an RRC (Radio Resource Control) Release message when the user equipment is in an RRC connected state, the RRC Release message including information indicating an uplink radio resource used for transmitting uplink data from the user equipment in an RRC inactive state. The processor is configured to control, in response to receiving the RRC Release message, the user equipment to transition from the RRC connected state to the RRC inactive state. The processor is conjured to transmit the uplink data by using the uplink radio resource indicated by the information included in the RRC Release message when the user equipment is in the RRC inactive state.

A user equipment according to a first feature includes: a receiver configured to receive, from a base station, an RNTI (Radio Network Temporary Identifier) for identifying the user equipment before the user equipment shifts from a RRC (Radio Resource Control) connected state to a RRC idle state; a controller configured to hold the RNTI; a transmitter configured to scramble information using the held RNTI and to transmit the scrambled information to the base station in the RRC idle state.

A base station according to a second feature includes: a transmitter configured to transmit, to a user equipment, an RNTI (Radio Network Temporary Identifier) for identifying the user equipment before the user equipment shifts from a RRC (Radio Resource Control) connected state to a RRC idle state; a receiver configured to receive information from the radio terminal in the RRC idle state, the received information scrambled using the RNTI.

A processor according to a third feature controls a user equipment. The processor configured to execute: a process of receiving, from a base station, an RNTI (Radio Network Temporary Identifier) for identifying the user equipment before the user equipment shifts from a RRC (Radio Resource Control) connected state to a RRC idle state; a process of holding the RNTI; a process of scrambling information using the held RNTI and transmitting the scrambled information to the base station in the RRC idle state.

A method according to a fourth feature includes receiving, by a user equipment, from a base station, an RNTI (Radio Network Temporary Identifier) for identifying the user equipment before the user equipment shifts from a RRC (Radio Resource Control) connected state to a RRC idle state; holding, by the user equipment, the RNTI; scrambling, by the user equipment in the RRC idle state, information using the held RNTI and transmitting the scrambled information to the base station.

DESCRIPTION OF EMBODIMENT

A radio terminal scrambles a transmission bit sequence using a C-RNTI (Cell-Radio Network Temporary Identifier) allocated by a base station. The C-RNTI is an identifier that uniquely identifies the radio terminal within a cell.

In a normal random access procedure, a Temporary C-RNTI is allocated to the radio terminal by the base station via Msg2 and the radio terminal uses the Temporary C-RNTI to perform scrambling processing in Msg3 transmission.

However, where the need for Msg1 and Msg2 is eliminated as mentioned above, uplink transmission (Msg3 transmission) could not be appropriately performed because a Temporary C-RNTI is not allocated to the radio terminal via Msg2.

The present disclosure provides a radio terminal and a base station that enable appropriate performance of uplink transmission even in the case where a Temporary C-RNTI is not allocated to the radio terminal via Msg2.

A mobile communications system according to one embodiment will be described with reference to the drawings. In the description of the drawings hereinbelow, the same or similar reference numerals are assigned to the same or similar parts.

(Mobile Communications System)

Figure 1:
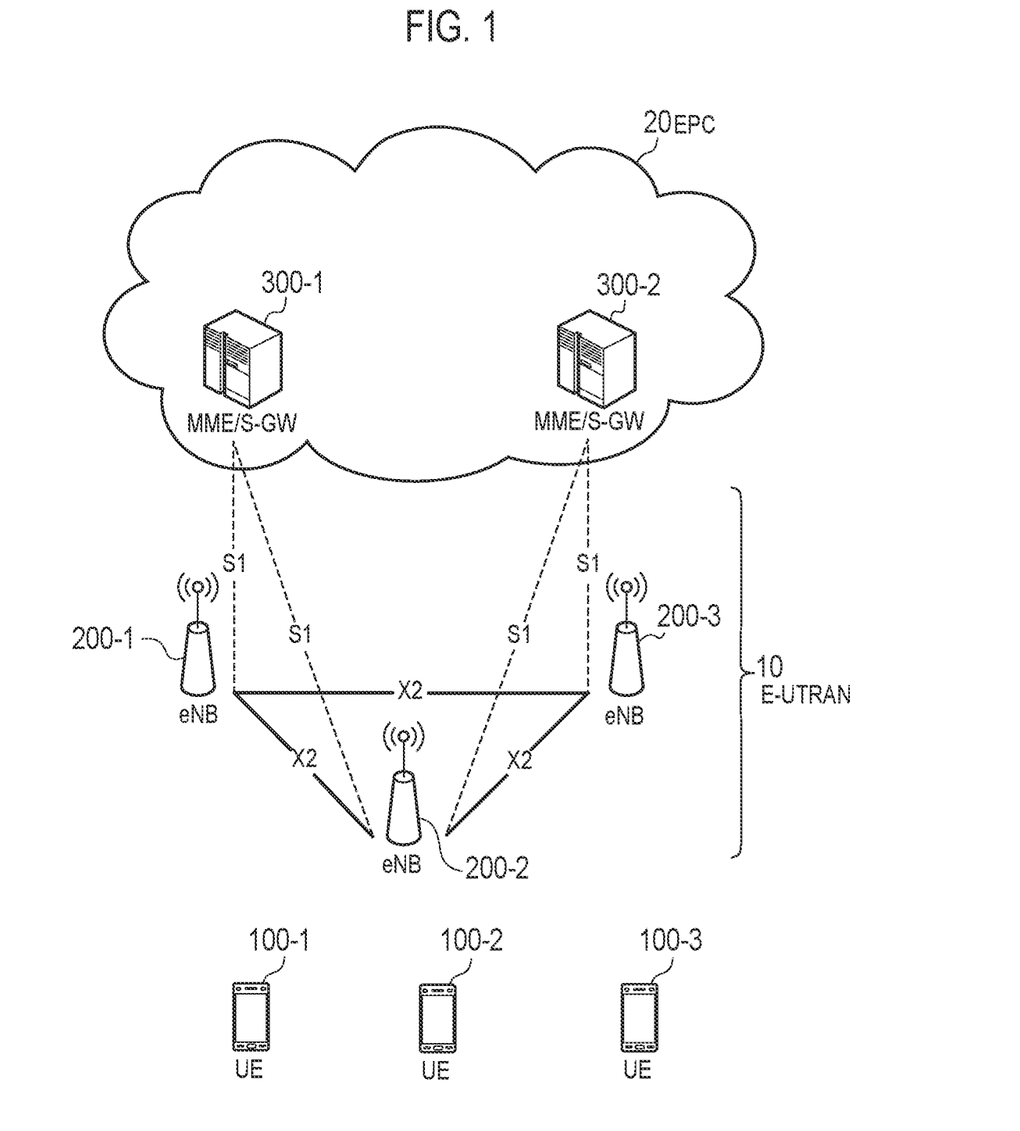
FIG. 1 is a diagram illustrating a configuration of an mobile communications system according to an embodiment.

The configuration of a mobile communications system according to the present embodiment will be described. FIG. 1 is a diagram illustrating a configuration of an LTE (Long Term Evolution) system which is the mobile communications system according to the present embodiment. The LTE system is a mobile communications system based on the 3GPP standard. However, the system is not limited to the LTE system, and may be an NR system which is a fifth generation (5G) mobile communication system based on the 3GPP standard.

As shown in FIG. 1, a mobile communications system according to the present embodiment is provided with a radio terminal (user equipment: UE) 100, a radio access network (evolved-UMTS terrestrial radio access network E-:UTRAN) 10, and a core network (evolved packet core: EPC) 20.

The UE 100 is a mobile-type communication apparatus. The UE 100 performs radio communications with an eNB 200 that manages the cell (serving cell) in which the UE 100 exists. The UE 100 may be any device as long as it is a device that performs radio communication with the eNB 200. For example, the UE 100 is a mobile phone terminal, a tablet terminal, a notebook PC, a sensor, a device installed in the sensor, a vehicle, or a device installed in vehicle.

The E-UTRAN 10 includes base stations (evolved Node-B: eNB) 200. The eNB 200 are interconnected via an X2 interface. The eNB 200 manage one or a plurality of cells. The eNB 200 perform radio communications with the UEs 100 that have established a connection with their own cells. The eNB 200 have a radio resource management (RRM) function, a user data (hereinafter suitably called "data") routing function, and a measurement control function for mobility control and scheduling, and the like. "Cell" is used as a term indicating the smallest unit of a radio communications area. "Cell" is also used as a term indicating a function or resource that performs radio communications with the UE 100. One cell belongs to one carrier frequency.

The EPC 20 includes a mobility management entity (MME) and serving gateway (S-GW) 300. The MME performs various mobility control with respect to the UE 100, and the like. The MME manages information of a tracking area (TA) in which the UE 100 exists by using non-access stratum (NAS) signaling to communicate with the UE 100. The tracking area is an area comprising a plurality of cells. The S-GW performs data transfer control. The MME and S-GW are connected to the eNB 200 via an Si interface.

Figure 2:
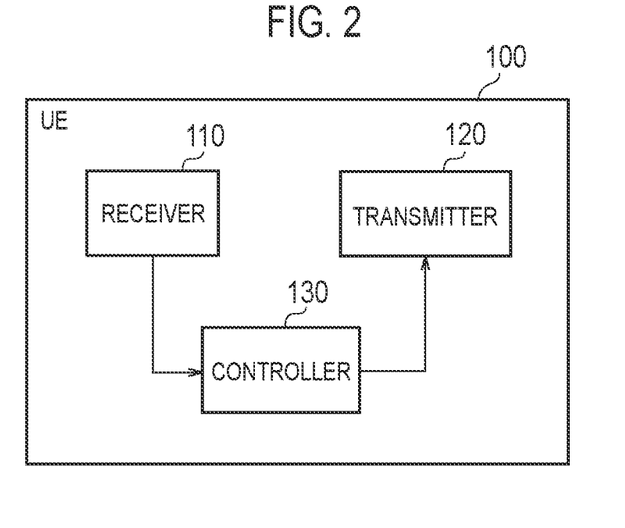
FIG. 2 is a diagram illustrating a configuration of a UE (radio terminal) according to the embodiment.

FIG. 2 is a diagram illustrating a configuration of the UE 100 (radio terminal) according to the present embodiment. As shown in FIG. 2, the UE 100 is provided with a receiver 110, a transmitter 120, and a controller 130.

The receiver 110 performs various reception under the control of the controller 130. The receiver 110 includes an antenna and a receiving set. The receiving set converts a radio signal received by the antenna to a baseband signal (reception signal) and outputs the baseband signal to the controller 130.

The transmitter 120 performs various transmission under the control of the controller 130. The transmitter 120 includes an antenna and a transmitting set. The transmitting set converts the baseband signal (transmission signal) output by the controller 130 to a radio signal and transmits the radio signal from the antenna.

The controller 130 performs various control of the UE 100. The controller 130 includes at least one processor and one memory. The memory stores a program executed by the processor and information used in processing by the processor. The processor may include a baseband processor and a central processing unit (CPU). The baseband processor performs modulation/demodulation and coding/decoding of baseband signals, and the like. The CPU performs various processing by executing the program stored in the memory. The processor executes processing that will be described subsequently.

Figure 3:
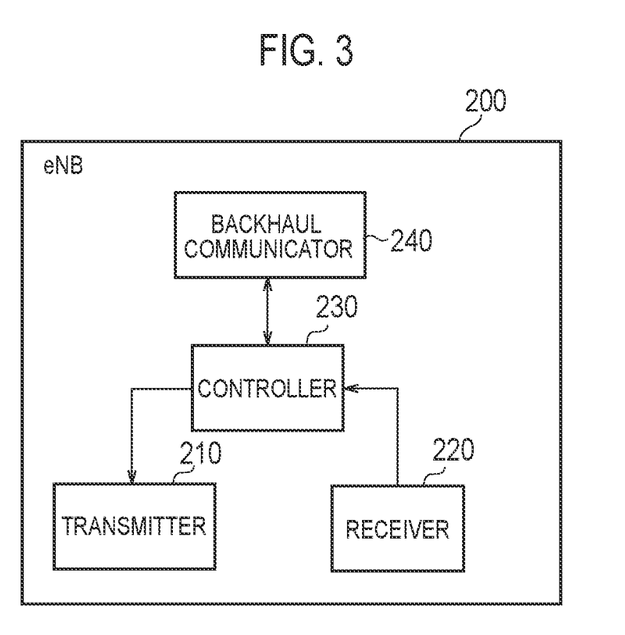
FIG. 3 is a diagram illustrating a configuration of an eNB (base station) according to the embodiment.

FIG. 3 is a diagram illustrating a configuration of the eNB 200 (base station) according to the present embodiment. As shown in FIG. 3, the eNB 200 is provided with a transmitter 210, a receiver 220, a controller 230, and a backhaul communicator 240.

The transmitter 210 performs various transmission under the control of the controller 230. The transmitter 210 includes an antenna and a transmitting set. The transmitting set converts the baseband signal (transmission signal) output by the controller 230 to a radio signal and transmits the radio signal from the antenna.

The receiver 220 performs various receptions under the control of the controller 230. The receiver 220 includes an antenna and a receiving device. The receiving device converts a radio signal received by the antenna into a baseband signal (received signal) and outputs the baseband signal to the controller 230.

The controller 230 performs various controls in the eNB 200. The controller 230 includes at least one processor and memory. The memory stores a program executed by the processor and information used for processing by the processor. The processor may include a baseband processor and a CPU. The baseband processor performs modulation/demodulation, encoding/decoding, and the like of the baseband signal. The CPU performs a variety of processing by executing programs stored in the memory. The processor executes processing to be described later.

The backhaul communicator 240 is connected to an adjacent eNB via an X2 interface. The backhaul communicator 240 is connected to an MME/S-GW 300 via an S1 interface. The backhaul communicator 240 is used for communication performed on the X2 interface, communication performed on the S1 interface, and the like.

Figure 4:
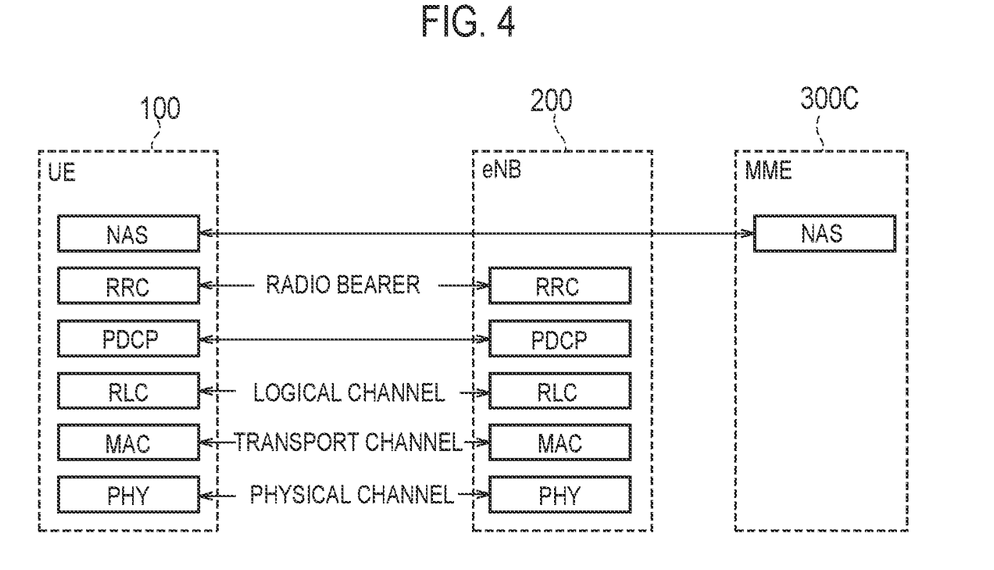
FIG. 4 is a diagram illustrating a protocol stack of a radio interface according to the embodiment.

FIG. 4 is a diagram illustrating a configuration of a protocol stack of a radio interface in the LTE system. As illustrated in FIG. 4, a radio interface protocol is divided into a first layer to a third layer of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute an access stratum (AS) layer.

The PHY layer performs coding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs data priority control, retransmission processing using hybrid ARQ (HARD), and random access procedures, and the like. Data and control information are transmitted between the MAC layer of the UE 100 and the MAC layer of the eNB 200 via a transport channel. The MAC layer of the eNB 200 includes a scheduler. The scheduler determines the transport format (transport block size, modulation/coding system (MCS)) of uplinks and downlinks, and the resource blocks allocated to the UE 100.

The RLC layer uses the functions of the MAC layer and PHY layer to transmit data to the RLC layer on the receiving side. Data and control information are transmitted between the RLC layer of the UE 100 and the RLC layer of the eNB 200 via a logical channel.

The PDCP layer performs header compression/extension and encryption/decoding.

The RRC layer is defined only by a control plane that handles the control information. RRC signaling for various configuration is transmitted between the RRC layer of the UE 100 and the RRC layer of the eNB 200. The RRC layer controls the logical channel, transport channel, and physical channel according to the establishment, re-establishment, and release of a radio bearer. If there is a connection (RRC connection) between the RRC of the UE 100 and the RRC of the eNB 200, the UE 100 is in an RRC connected mode. When there is no connection (RRC connection) between the RRC of the UE 100 and the RRC of the eNB 200, the UE 100 is in an RRC idle mode. The RRC connected mode is an example of a connected state, and the RRC idle mode is an example of a standby state.

A NAS layer, which is located on top of the RRC layer, performs session management and mobility management, and the like. NAS signaling is transmitted between the NAS layer of the UE 100 and the NAS layer of an MME 300C. Besides a radio interface protocol, the UE 100 has an application layer function or another such function.

Figure 5:
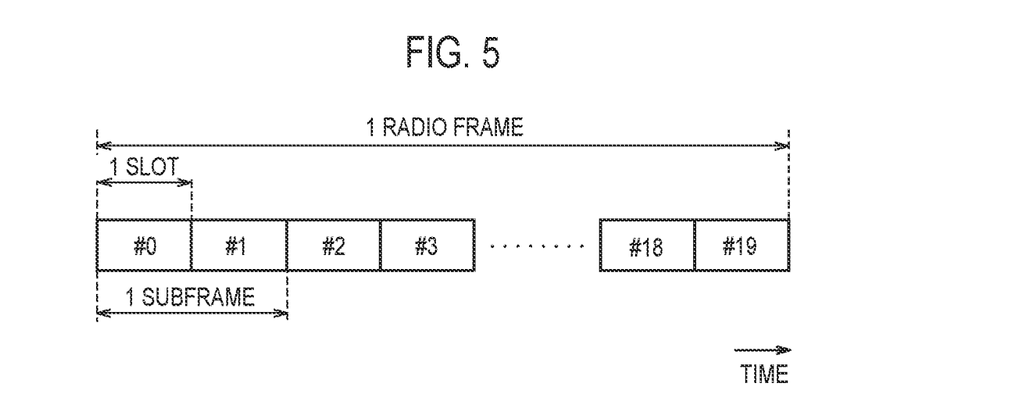
FIG. 5 is diagram illustrating a configuration of a radio frame according to the embodiment.

FIG. 5 is a diagram illustrating a configuration of a radio frame used in an LTE system. As shown in FIG. 5, the radio frame is configured from ten subframes on a time axis. The subframes are each configured from two slots on the time axis. The length of each subframe is 1 ms. The length of each slot is 0.5 ms. Each subframe contains a plurality of resource blocks (RB) on a frequency axis. Each subframe contains a plurality of symbols on the time axis. Each resource block contains a plurality of subcarriers on the frequency axis. More specifically, one RB is configured from twelve subcarriers and one slot. One resource element (RE) is configured from one symbol and one subcarrier. Among the radio resources (time/frequency resources) allocated to the UE 100, the frequency resources can be specified by means of resource blocks and the time resources can be specified by means of subframes (or slots).

In a downlink, an interval of the first few symbols of each subframe is a region mainly used as a physical downlink control channel (PDCCH) for transmitting downlink control information. The remainder of each subframe is a region that can be used mainly as a physical downlink shared channel (PDSCH) for transmitting downlink data.

In an uplink, both ends in the frequency direction of each subframe are regions which are mainly used as a physical uplink control channel (PUCCH) for transmitting uplink control information. The remainder of each subframe is a region that can be mainly used as a physical uplink shared channel (PUSCH) for transmitting uplink data.

(eMTC and NB-IoT)

In the present embodiment, a scenario is assumed where new-category UEs 100 which are directed toward machine type communication such as MTC and IoT services exist. The new-category UEs 100 are UEs 100 for which transmission/reception bandwidths are restricted only in a portion of the system transmission/reception frequency bands (LTE transmission/reception bandwidths).

The new UE categories are called category M1 and category narrow band (NB)-IoT, for example. Category M1 is a category to which enhanced Machine Type Communications (eMTC) UEs belong. Category NB-IoT (category NB1) is a category to which NB-IoT UEs belong. Category M1 restricts the transmission/reception bandwidths of the UEs 100 (eMTC UEs) to 1.08 MHz (that is, a six resource block bandwidth), for example. Category NBIoT (category NB1) further restricts the transmission/reception bandwidths of the UEs 100 (NB-IoT UE) to 180 kHz (that is, a one resource block bandwidth). By changing to this narrow band, low costs and low power consumption, which are required for eMTC UEs and NB-IoT UEs, can be realized.

Figure 6:
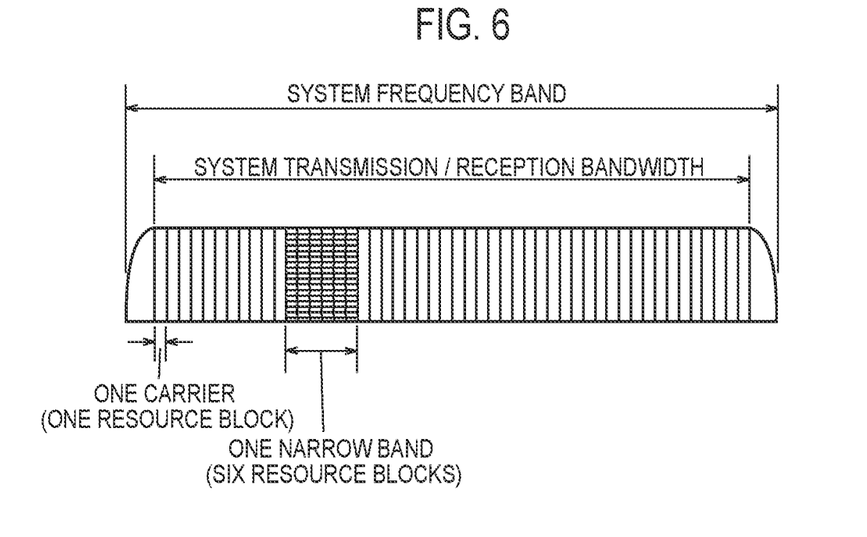
FIG. 6 is a diagram illustrating a frequency channel handled by an eMTC UE and an NB-IoT UE.

FIG. 6 is a diagram illustrating frequency channels that are handled by eMTC UEs and NB-IoT UEs. As illustrated in FIG. 6, the frequency bandwidth for the system frequency bands of an LTE system can be 10 MHz. The bandwidth of the system transmission/reception bands is 50 resource blocks=9 MHz, for example. The bandwidth of a frequency channel with which an eMTC UE is compatible is equal to or less than six resource blocks=1.08 MHz. A frequency channel of no more than six resource blocks with which an eMTC UE is compatible is called "narrowband (NB)". The bandwidth of a frequency channel with which an NB-IoT UE is compatible is one resource block=180 kHz. A single resource block frequency channel with which an NB-IoT UE is compatible is called a "carrier."

An eMTC UE is operated in an LTE transmission/reception bandwidth. The NB-IoT UE supports modes operated in an LTE transmission/reception bandwidth, modes operated in a guard band outside the LTE transmission/reception bandwidth, and modes operated in frequency bands dedicated to NB-IoT.

In order to implement expanded coverage, the eMTC UEs and NB-IoT UEs support an enhanced coverage (EC) function which uses repeated transmissions and the like. The enhanced coverage function may also include repeated transmission (repetition) in which the same signal is repeatedly transmitted using a plurality of subframes. The greater the number of repeated transmissions, the more coverage can be expanded.

(Random Access Procedure)

Figure 7:
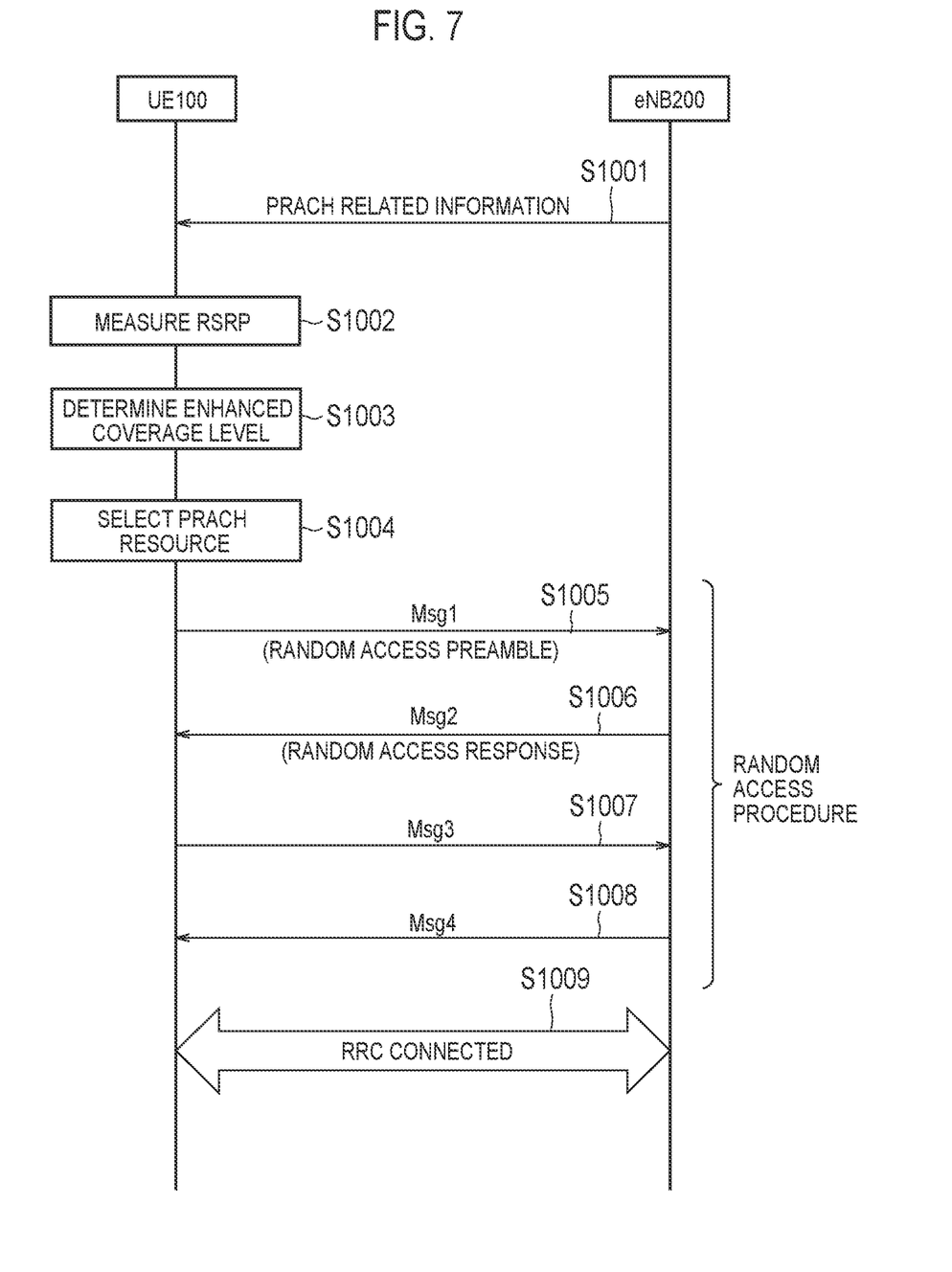
FIG. 7 is a diagram illustrating a general random access procedure for an eMTC UE and an NB-IoT UE.

FIG. 7 is a diagram illustrating a general random access procedure for eMTC UEs and NB-IoT UEs. In an initial state, the UE 100 is in RRC idle mode. The UE 100 executes the random access procedure in order to transition to RRC connected mode. Such a case is called an initial connection (initial access from RRC_IDLE). At the time of an initial connection, a contention-based random access procedure is applied.

As shown in FIG. 7, the UE 100 selects an eNB 200 cell as the serving cell. The UE 100 may also determine that same lies within enhanced coverage if a first cell selection criterion (a first S-criteria) for normal coverage is not satisfied and a second cell selection criterion (a second Scriteria) for enhanced coverage is satisfied. A "UE lying within enhanced coverage" signifies a UE which is required to use an enhanced coverage function (enhanced coverage mode) to access the cell. Note that an eMTC UE must use an enhanced coverage mode. Here, the description will be continued on the assumption that the UE 100 lies within enhanced coverage.

In step S1001, the eNB 200 transmits physical random access channel (PRACH)-related information by means of broadcast signaling (SIB, for example). The PRACH-related information includes various parameters provided for each enhanced coverage level. By way of an example, a total of four levels, namely, enhanced coverage levels 0 to 3, are defined as enhanced coverage levels. The various parameters include a reference signal received power (RSRP) threshold value, PRACH resources, and a maximum preamble transmission count. The PRACH resources include radio resources (time/frequency resources) and a signal sequence (preamble sequence). The UE 100 stores the received PRACH-related information.

In step S1002, the UE 100 measures the RSRP on the basis of a reference signal that is transmitted from the eNB 200.

In step S1003, the UE 100 determines its own enhanced coverage level (CE level) by comparing the measured RSRP with the RSRP threshold value for each enhanced coverage level. The enhanced coverage level indicates the extent of the enhanced coverage required by the UE 100. The enhanced coverage level relates to at least the transmission count (that is, the number of repetitions) for repeated transmissions.

In step S1004, the UE 100 selects the PRACH resource corresponding to its own enhanced coverage level.

Steps S1005 to S1008 constitute the random access procedure. In step S1005, the UE 100 uses the selected PRACH resource to transmit a Msg 1 (random access preamble) to the eNB 200. Note that "Msg" is an abbreviation for message. The eNB 200 specifies the enhanced coverage level of the UE 100 on the basis of the PRACH resource used for the received Msg 1.

In step S1006, the eNB 200 transmits, to the UE 100, Msg2 (random access response) including scheduling information indicating a PUSCH resource allocated to the UE 100. Here, the Msg2 includes a Temporary C-RNTI allocated to the UE 100 by the eNB 200. The Msg2 also includes a timing advance value calculated by the eNB 200 based on a random access preamble. The timing advance value is a transmit timing adjustment value for compensating for a propagation delay of radio signals. Note that the UE 100 can transmit the Msg1 plural times up to the maximum number of times of preamble transmissions corresponding to its own enhanced coverage level until the UE 100 normally receives the Msg2

In step S1007, the UE 100 transmits Msg3 to the eNB 200 based on the scheduling information. The Msg3 may be an RRC connection request message. Here, the UE 100 makes a transmit timing adjustment using the timing advance value which was included in the Msg2. The UE 100 also performs scrambling processing using the Temporary C-RNTI which was included in the Msg2. Specifically, the UE 100 generates a UE-specific scrambling sequence from the Temporary C-RNTI and scrambles a transmission bit sequence (code word) with the UE-specific scrambling sequence in the PHY layer. In a similar manner, the eNB 200 performs descrambling processing using the Temporary C-RNTI allocated to the UE 100.

In step S1008, the eNB 200 transmits Msg4 to the UE 100. The Msg4 may be an RRC connection setup message. Here, the eNB 200 performs scrambling processing of the PDCCH using the Temporary C-RNTI. Specifically, the eNB 200 transmits, via the PDCCH, downlink control information (DCI) with a CRC (Cyclic Redundancy Check) parity bit scrambled with the Temporary C-RNTI, and the UE 100 attempts decoding of the DCI and detects a PDCCH for which a CRC check is successful as the PDCCH intended for itself (so-called blind decoding).

In step S1009, the UE 100 transitions to RRC connected mode in response to receiving Msg 4. Thereupon, the UE 100 may transmit a Msg 5: RRC connection establishment completion (RRC connection setup complete) message to the eNB 200. Thereafter, the eNB 200 controls the repeated transmissions to the UE 100, and the like, on the basis of the specified enhanced coverage level.

Having transitioned to the RRC connected mode, the UE 100 continuously uses the Temporary C-RNTI that was included in the Msg2 as the C-RNTI allocated to itself while the UE 100 is in the RRC connected mode.

(EDT)

An eMTC UE or NB-IoT UE has a small volume of data to be transmitted and received and transmits and receives data infrequently. In the present embodiment, an example is described in which early data transmission (EDT), in which an eMTC UE or NB-IoT UE uses a predetermined message during the random access procedure to transmit and receive user data, is performed.

EDT includes uplink EDT, in which uplink data is transmitted and received by using Msg 3 in the random access procedure, and downlink EDT, in which downlink data is transmitted and received by using Msg 4 in the random access procedure. More specifically, cases include those where both uplink EDT and downlink EDT are implemented in one random access procedure, where only uplink EDT is implemented, and where only downlink EDT is implemented.

There are two varieties of EDT, namely, the user plane (UP) solution and the control plane (CP) solution. In the case of the UP solution, in the EDT, instead of user data (DTCH) being contained in an RRC message (CCCH), the user data and RRC message are multiplexed and transmitted in a single MAC PDU in the MAC layer. On the other hand, in the case of the CP solution, user data is contained in the RRC message in the EDT.

The UP solution is applied when the UE 100 is in a suspend state, which is a substate of the RRC idle mode. The suspend state is a substate of the RRC idle mode in which context information of the UE 100 is maintained in the eNB 200. In the case of the UP solution, the RRC message constituting Msg 3 is an RRC connection resume request message, and the RRC message constituting Msg 4 is an RRC connection resume message, an RRC connection release message or an RRC connection reject message. Upon receiving an RRC connection release message or an RRC connection reject message, the UE 100 ends the random access procedure while still maintaining RRC idle mode. On the other hand, upon receiving an RRC connection resume message, the UE 100 transitions to RRC connected mode and transmits and receives user data in RRC connected mode.

The CP solution is applied to cases where the UE 100 is in RRC idle mode and not in a suspend state. In the case of the CP solution, the RRC message constituting Msg 3 is an early data request message and the RRC message constituting Msg 4 is basically an early data complete message. Upon receiving an early data complete message, the UE 100 ends the random access procedure while still maintaining RRC idle mode. However, the RRC message constituting Msg 4 may be an RRC connection setup message. Upon receiving an RRC connection setup message, the UE 100 transitions to RRC connected mode and transmits and receives user data in RRC connected mode.

(GFT Procedure)

In order to further reduce the signaling between the eNB 200 and the UE 100, the present embodiment introduces a new procedure that enables data transmission without the need for Msg1 and Msg2 in the random access procedure. The procedure is referred to as a GFT (Grant-Free Transmission) procedure. Alternatively, the procedure may be referred to as a RACH (Random Access Channel)-less data transmission procedure.

Upon starting the GTF procedure, the UE 100 in the RRC idle mode omits the transmission of Msg1 and reception of Msg2 and transmits Msg3 to the eNB 200. Here, the UE 100 may transmit uplink data to the eNB 200 using the Msg3 via uplink EDT. The UE 100 may also receive downlink data from the eNB 200 using Msg4 via downlink EDT. While the GTF procedure is not necessarily predicated on EDT, the present embodiment mainly assumes the case of introducing the GFT procedure given the EDT as a precondition.

Since the GFT procedure is a procedure for the UE 100 to transition from the RRC idle mode to the RRC connected mode, it can be considered to be a sort of the random access procedure. On the other hand, since the UE 100 does not perform random access (i.e., does not transmit a random access preamble) in the GFT procedure, it can also be considered to be a procedure different from the random access procedure. In the following, description will be made regarding the GFT procedure as a procedure different from the random access procedure.

In the random access procedure, a Temporary CRNTI is allocated to the UE 100 by the eNB 200 via Msg2,and the UE 100 uses the Temporary C-RNTI to perform scrambling processing in Msg3 transmission. However, as the GTF procedure eliminates the need for Msg1 and Msg2, no Temporary C-RNTI is allocated to the UE 100 via Msg2.

At the UE 100 according to the present embodiment, the receiver 110 receives an identifier allocated by the eNB 200 to the UE 100 from the eNB 200. Specifically, the receiver 110 receives the identifier from the eNB 200 before the UE 100 transitions to the RRC connected mode. The controller 130 holds the identifier while the UE 100 is in the RRC idle mode, and starts a GFT procedure. The transmitter 120 scrambles a bit sequence using the identifier being held and transmits the scrambled bit sequence to the eNB 200 during the GFT procedure. Specifically, in the PHY layer, a UE-specific scrambling sequence is generated from the identifier being held, and a transmission bit sequence (code word) is scrambled with the UE-specific scrambling sequence and is transmitted.

Meanwhile, at the eNB 200 according to the present embodiment, the transmitter 210 transmits, to the UE 100, the identifier allocated to the UE 100. Specifically, the transmitter 210 transmits the identifier to the UE 100 before the UE 100 transitions to the RRC connected mode. The controller 230 holds the identifier while the UE 100 is in the RRC idle mode. The receiver 220 receives the bit sequence from the UE 100 during the GFT procedure and performs descrambling on the received bit sequence using the identifier being held. Specifically, in the PHY layer, the UE-specific scrambling sequence is generated from the identifier being held and the transmission bit sequence (code word) is descrambled with the UE-specific scrambling sequence.

In this manner, uplink transmission can be appropriately performed because a bit sequence can be scrambled and descrambled using a previously held identifier even in the case where no Temporary C-RNTI is allocated to the UE 100 via Msg2. For the previously held identifier, any of (A) Resume ID, (B) a C-RNTI candidate, and (C) the most recently allocated C-RNTI can be used.

(A) Case of Using Resume ID

In the case of using Resume ID, the receiver 110 of the UE 100 receives a Resume ID included in a connection release message (RRC) transmitted from the eNB 200. The controller 130 of the UE 100 holds the Resume ID while the UE 100 is in the RRC idle mode. The transmitter 120 of the UE 100 scrambles a bit sequence using at least a portion of the Resume ID being held and transmits the scrambled bit sequence during the GFT procedure.

Here, if a bit length (L1) of the Resume ID is longer than a bit length (L2) of the C-RNTI, a portion equivalent to L2 is extracted from the Resume ID and it is used. For example, a rule such as extracting and using the upper L2 bits of the Resume ID or extracting and using the lower L2 bits of the Resume ID is predefined. The rule may be shared by the eNB 200 and the UE 100 by being sent from the eNB 200 to the UE 100 or being held in advance at the UE 100 and the eNB 200. The UE 100 and the eNB 200 use the bit sequence extracted from the Resume ID (hereinafter referred to as a "portion of the Resume ID") in place of the Temporary C-RNTI during the GFT procedure. Note that L1 and L2 indicate bit length values.

Figure 8:
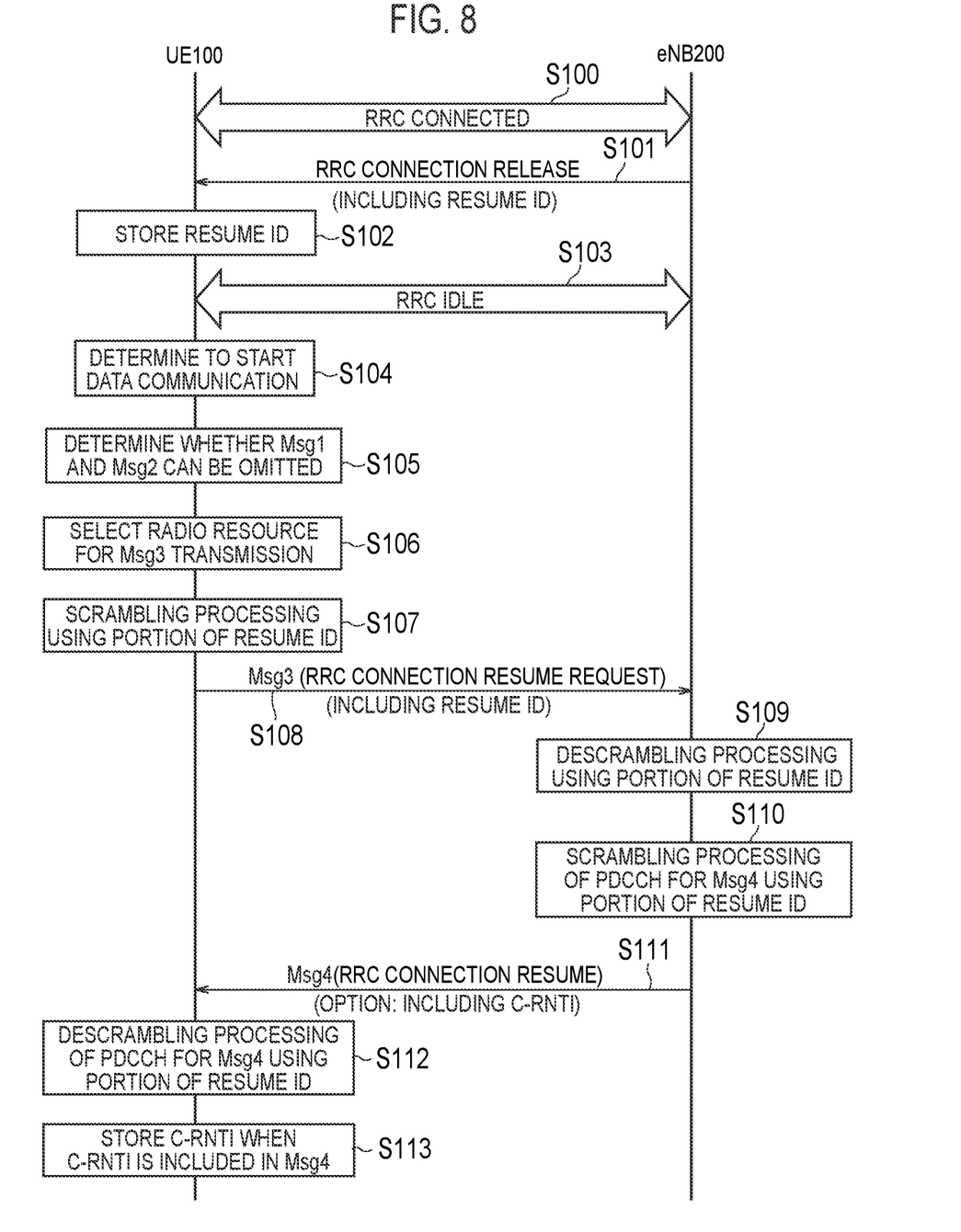
FIG. 8 is a diagram illustrating an operation example in a case of using Resume ID according to an embodiment.

FIG. 8 is a diagram illustrating an operation example in the case of using Resume ID. This operation example is an operation example based on the UP solution of the EDT.

As illustrated in FIG. 8, in step S100, the UE 100 is in the RRC connected mode and performs radio communication with the eNB 200. Also, the controller 130 of the UE 100 manages the timing advance value, and makes a transmit timing adjustment using the timing advance value in order to compensate for a propagation delay of a radio signal.

In step S101, the transmitter 210 of the eNB 200 transmits an RRC Connection Release message including the Resume ID to the UE 100. The receiver 110 of the UE 100 receives the RRC Connection Release message including the Resume ID. Note that the eNB 200 stores the Resume ID in association with the identifier and/or context of the UE 100. The eNB 200 uses the stored Resume ID in step S109 and S110 to be describer later.

In step S102, the controller 130 of the UE 100 holds the Resume ID included in the RRC Connection Release message. Similarly, the controller 230 of the eNB 200 holds the Resume ID allocated to the UE 100. Specifically, the controller 230 of the eNB 200 holds the context information of the UE 100 (UE context) and the Resume ID in association with each other.

In step S103, the UE 100 transitions to the RRC idle mode in response to the reception of an RRC Connection Release message. The controller 130 of the UE 100 will hold the timing advance value at that point (the point of reception of the RRC Connection Release message or the point of transition to the RRC idle mode). Also, the controller 130 of the UE 100 measures a path loss with the eNB 200 and holds the pass loss in association with the timing advance value. Note that the path loss is the difference between a reference signal transmission power at the eNB 200 (which has been indicated to the UE 100 via broadcast) and a reference signal reception power at the UE 100.

The controller 130 and the receiver 110 of the UE 100 perform a standby operation, that is, monitoring of paging, in the RRC idle mode. Note that assuming machine type communication, the duration of the RRC idle mode can be a long time. Also, the UE 100 can move while the UE 100 is in the RRC idle mode.

In step S104, the controller 130 of the UE 100 determines that there is a need to perform data communication. For example, the controller 130 of the UE 100 determines that there is a need to perform data communication (reception of downlink data) in response to generation of uplink data to be transmitted or reception of paging intended for itself. The present description is made on the assumption that uplink data to be transmitted has been generated.

In step S105, the controller 130 of the UE 100 determines whether Msg1 and Msg2 can be omitted or not, that is, whether the GFT procedure is available or not. In other words, the controller 130 of the UE 100 selects either one of a random access procedure (a first procedure) including the transmission of Msg1 and the reception of Msg2 and the GFT procedure (a second procedure) not including the transmission of Msg1 and the reception of Msg2.

For the decision criteria here, the following three decision criteria can be used. It may be determined that the GFT procedure is available when all of the three decision criteria are satisfied or it may be determined that the GFT procedure is available when one or two of the three decision criteria is/are satisfied. Note that the three decision criteria or at least one of the three decision criteria (e.g., decision criteria 2 and 3) may be transmitted from the eNB 200 to the UE 100 by broadcast or unicast, or the UE 100 may hold them in its SIM (U-SIM) or memory beforehand.

Decision criterion 1: the eNB 200 has transmitted information or a message indicating that the GFT procedure is supported.

For example, on the condition that the eNB 200 has broadcast such information or a message, the controller 130 of the UE 100 determines that the GFT procedure is available. For such information or a message, candidate radio resource information for the GFT procedure (details are discussed later) may be used. Alternatively, the UE 100 may make a query to the eNB 200 in advance as to whether the eNB 200 supports the GFT procedure or not, and the eNB 200 transmits whether it supports the GFT procedure or not to the UE 100 by unicast via UE-specific signaling (dedicated signaling), whereby the UE 100 learns whether the eNB 200 supports the GFT procedure or not.

Decision criterion 2: the current position of the UE 100 is within an area that satisfies a predetermined relationship with the eNB 200.

For using the GFT procedure, it would be necessary that the UE context is held at the eNB 200. Thus, the GFT procedure would be not available if a first eNB at the time the UE 100 transitions to the RRC idle mode and a second eNB at the time the UE 100 starts the GFT procedure are different eNBs 200 and if UE context is not being held at the second eNB. For the method of determining the range in which the UE context is being held, the following specific examples are possible.

The cell at the time of transition to the RRC idle mode is the same as the cell at the time of starting the GFT procedure. For identifying cells, physical cell IDs can be used.

The eNB at the time of transition to the RRC idle mode is the same as the eNB 200 at the time of starting the GFT procedure. For identifying eNBs, ECGI (E-UTRAN Cell Global Identifier) can be used.

The eNB at the time of transition to the RRC idle mode and the eNB 200 at the time of starting the GFT procedure are in adjacency relationship. This is because when they are in adjacency relationship, it is possible that the context of the UE 100 held at the eNB has been transmitted to the adjacent eNB 200 via exchange of messages between base stations.

The RAN area at the time of transition to the RRC idle mode is the same as the RAN area at the time of starting the GFT procedure. Here, a RAN area refers to a RAN Paging Area or a RAN Notification Area, which are under consideration for introduction in the 5G mobile communication system.

The tracking area (or MME) at the time of transition to the RRC idle mode is the same as the tracking area (or MME) at the time of starting the GFT procedure. For identifying tracking areas, tracking area identifiers can be used.

Decision criterion 3: the difference between a first path loss between the eNB 200 and the UE 100 at the time of transition to the RRC idle mode and a second path loss between the eNB 200 and the UE 100 at the time of starting the GFT procedure is equal to or below a predetermined value.

Assume that a transmit timing adjustment is made using the timing advance value held by the UE 100 during uplink transmission in the GFT procedure. In such a case, if the distance between the UE 100 and the eNB 200 has significantly varied, the timing advance value has become an improper value, so the timing advance value needs to be updated via Msg1 and Msg2. Thus, the GFT procedure is available only if the difference in path loss is small. Note that if the UE 100 has a GNSS receiving device, GNSS position information may be used in place of path loss.

Note that the decision criteria are not limited to the three above. Also, aside from the three decision criteria above, the amount of data to be transmitted by the UE 100 being below a certain value may be a decision criterion for determining that the GFT procedure is available.

In the following, description is made on the assumption that the UE 100 selects the GFT procedure.

In step S106, the UE 100 selects a radio resource for uplink transmission in the GFT procedure. Specifically, the receiver 110 of the UE 100 receives, from the eNB 200, information indicating candidate radio resources for use in the transmission of the bit sequence, and the controller 130 of the UE 100 selects a radio resource for use in the transmission of the bit sequence from the candidate radio resources based on the identifier being held (in this operation example, the Resume ID or a portion thereof). By thus selecting a resource by means of an identifier, collision of resources between a plurality of UEs 100 can be suppressed.

Here, the information indicating candidate radio resources is broadcast in system information (SIB) or is transmitted by unicast via UE-specific signaling (dedicated signaling) by the transmitter 210 of the eNB 200. In the case of unicast, the information indicating candidate radio resources may be included in the RRC Connection Release message in step S101. Alternatively, the information indicating candidate radio resources may be preconfigured in the UE 100.

Information indicating candidate radio resources includes the following pieces of information.

Frequency information: frequency band (Band), carrier frequency (Frequency), bandwidth (Bandwidth part), narrowband (Narrowband), carrier (Carrier), resource block (Resource Block), sub-carrier (Sub-carrier), frequency interval, offset Time information: hyper-frame number (H-SFN), system frame number (SFN), subframe number (Subframe #), slot number (Slot #), symbol number (Symbol #), time interval, offset IDs indicating radio resources: explicit numbers, and an entry order in list form (implicit numbers). Here, the frequency information and/or the time information are associated with IDs and a radio resource is defined for each ID.

For selecting a radio resource based on the identifier (in this operation example, the Resume ID or a portion thereof) being held by the UE 100, methods like the following ones can be used.

Selecting a radio resource that satisfies "the identifier held by the UE 100" mod M=ID. Note that M may be an arbitrary value. Also, M and the equation may be shared in advance between the UE 100 and the eNB 200.

Designating a radio resource (a radio resource pool or a radio resource ID) for which transmission by the UE 100 in question is permitted, via dedicated signaling such as RRC Connection Release.

In step S107, the transmitter 120 of the UE 100 uses the portion of the Resume ID being held to scramble a bit sequence corresponding to Msg3. This operation example assumes the UP solution of the EDT, where user data (DTCH) and the RRC message (CCCH) are multiplexed in one MAC PDU in the MAC layer. In the MAC layer, the bit sequence corresponding to that MAC PDU is scrambled.

Here, the RRC message is an RRC Connection Resume Request message. Note that the Resume ID is included in the RRC Connection Resume Request message. Also, since the eNB 200 holds the Resume ID allocated to the UE 100, the Resume ID may not be included in the RRC Connection Resume Request message.

In step S108, the transmitter 120 of the UE 100 transmits the bit sequence scrambled in step S107 via the radio resource (time and frequency resource) selected in step S106 during the GFT procedure.

Also, as mentioned above, the controller 130 of the UE 100 holds the timing advance value that had been used in the communication with the eNB 200 before transitioning to the RRC idle mode while the UE 100 is in the RRC idle mode. The transmitter 120 of the UE 100 adjusts the transmit timing of the scrambled bit sequence using the timing advance value being held.

The receiver 110 of the eNB 200 receives the transmission bit sequence from the UE 100. The receiver 110 of the eNB 200 may receive it by monitoring candidate radio resources (radio resources in the radio resource pool) in a round robin manner, or may receive it by monitoring the radio resource identified with the identifier being held (the Resume ID or a portion thereof).

In step S109, the receiver 220 of the eNB 200 descrambles the bit sequence received from the UE 100 using the portion of the Resume ID being held. The controller 230 of the eNB 200 retrieves the MAC PDU from the received bit sequence and retrieves the uplink data and the RRC message.

The controller 230 of the eNB 200 determines whether or not to allow the UE 100 to continue using the portion of the Resume ID as its C-RNTI. For example, if it overlaps an RNTI (a portion of a Resume ID) already generated for another UE, the controller 130 of the eNB 200 determines to use a different RNTI as the C-RNTI. If the UE 100 is not allowed to continue using the portion of Resume ID as its C-RNTI, then the C-RNTI is included in Msg4. By contrast, if the UE 100 is allowed to continue using the portion of Resume ID as the C-RNTI, the C-RNTI is not included in Msg4.

In step S110, the transmitter 210 of the eNB 200 scrambles the PDCCH for Msg4 transmission using the portion of Resume ID being held. Specifically, it generates DCI with a CRC parity bit scrambled with the portion of Resume ID being held.

In step S111, the transmitter 210 of the eNB 200 transmits Msg4 to the UE 100. Specifically, the transmitter 210 of the eNB 200 transmits Msg4 (RRC Connection Resume) to the UE 100 via the PDSCH after transmitting the DCI (PDCCH). This Msg4 may include the C-RNTI. Note that if the eNB 200 does not resume an RRC Connection with the UE 100, the Msg4 may be RRC Connection Reject or RRC Connection Release instead of RRC Connection Resume.

In step S112, the receiver 110 of the UE 100 performs descrambling on the PDCCH from the eNB 200 using the portion of the Resume ID being held. The receiver 110 of the UE 100 attempts decoding on the DCI and detects a PDCCH for which a CRC check is successful as the PDCCH intended for itself (blind decoding). After decoding the PDCCH by descrambling, the receiver 110 of the UE 100 receives the PDSCH (Msg4) from the eNB 200.

In step S113, if a new identifier (C-RNTI) allocated to the UE 100 by the eNB 200 is included in the Msg4, the controller 130 of the UE 100 overwrites the Resume ID being held with that C-RNTI. If the UE 100 transitions to the RRC connected mode, it continuously uses the C-RNTI while the UE 100 is in the RRC connected mode. By contrast, if a new identifier (C-RNTI) allocated to the UE 100 by the eNB 200 is not included in the Msg4 and if the UE 100 transitions to the RRC connected mode, the UE 100 continuously uses the portion of the Resume ID being held as its CRNTI while the UE 100 is in the RRC connected mode. In that case, the eNB 200 handles the portion of Resume ID as the C-RNTI of the UE 100 after the UE 100 has transitioned to the RRC connected mode.

(B) Case of Using a C-RNTI Candidate

Figure 9:
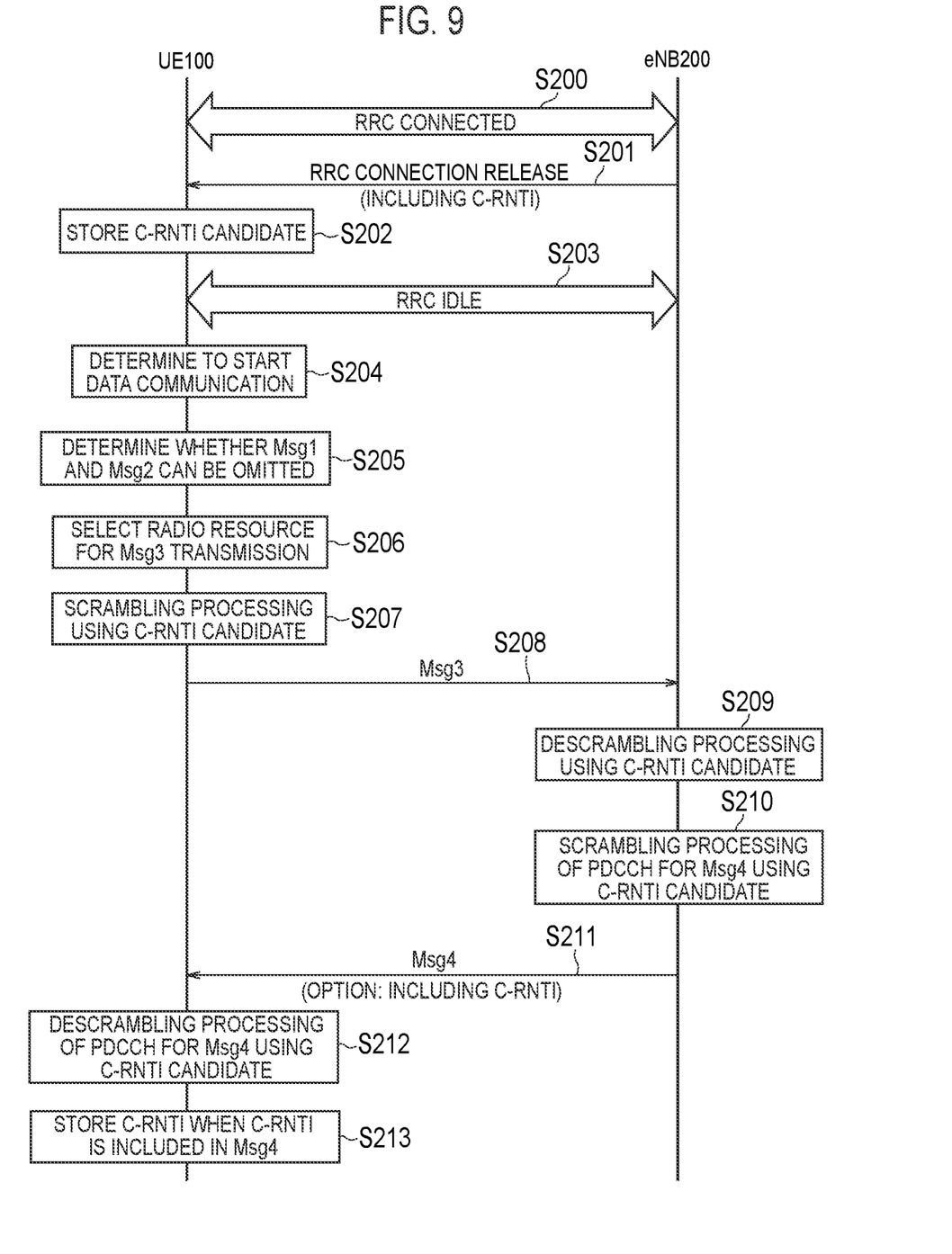
FIG. 9 is a diagram illustrating an operation example in a case of using a C-RNTI candidate according to an embodiment.

FIG. 9 is a diagram illustrating an operation example in the case of using a C-RNTI candidate. This operation example may be based on the UP solution of the EDT or may be based on the CP solution of the EDT. Herein, differences from the (A) case of using Resume ID discussed above are described and overlapping descriptions are omitted.

In the case of using a C-RNTI candidate, the receiver 110 of the UE 100 receives the C-RNTI candidate included in an RRC Connection Release message transmitted from the eNB 200. The controller 130 of the UE 100 holds the C-RNTI candidate while the UE 100 is in the RRC idle mode. The transmitter 120 of the UE 100 scrambles a bit sequence using the C-RNTI candidate being held and transmits the scrambled bit sequence during the GFT procedure.

In this way, in the case of using a C-RNTI candidate, the eNB 200 includes a C-RNTI candidate as a new information element of the RRC Connection Release message. The UE 100 holds the C-RNTI candidate while the UE 100 is in the RRC idle mode and uses the C-RNTI candidate being held in the GFT procedure.

As illustrated in FIG. 9, step S200 is the same as the operation in the (A) case of using Resume ID described above.

In step S201, the transmitter 210 of the eNB 200 transmits an RRC Connection Release message including a C-RNTI candidate to the UE 100. The bit length of this C-RNTI candidate is the same as the bit length of the C-RNTI.

In step S202, the controller 130 of the UE 100 holds the C-RNTI candidate. The controller 230 of the eNB 200 also holds the C-RNTI candidate. The controller 230 of the eNB 200 manages this C-RNTI candidate so that it is not allocated to other UEs 100. Note that the UE 100 and the eNB 200 may discard/release this C-RNTI candidate after elapse of a certain period of time. The period of time may be transmitted to the UE 100 by the eNB 200 by being included in the RRC Connection Release message in step S201.

For the operations in steps S203 to S213, the portion of the Resume ID in the operations in the (A) case of using Resume ID described above can be read as a C-RNTI candidate.

Note that in step S208, Msg3 may be an RRC Connection Request message instead of RRC Connection Resume Request message, and in step S211, Msg4 may be an RRC Connection Setup message, an RRC Connection Reject message, or an RRC Connection Release message.

(C) Case of Using the Most Recently Allocated C-RNTI

Figure 10:
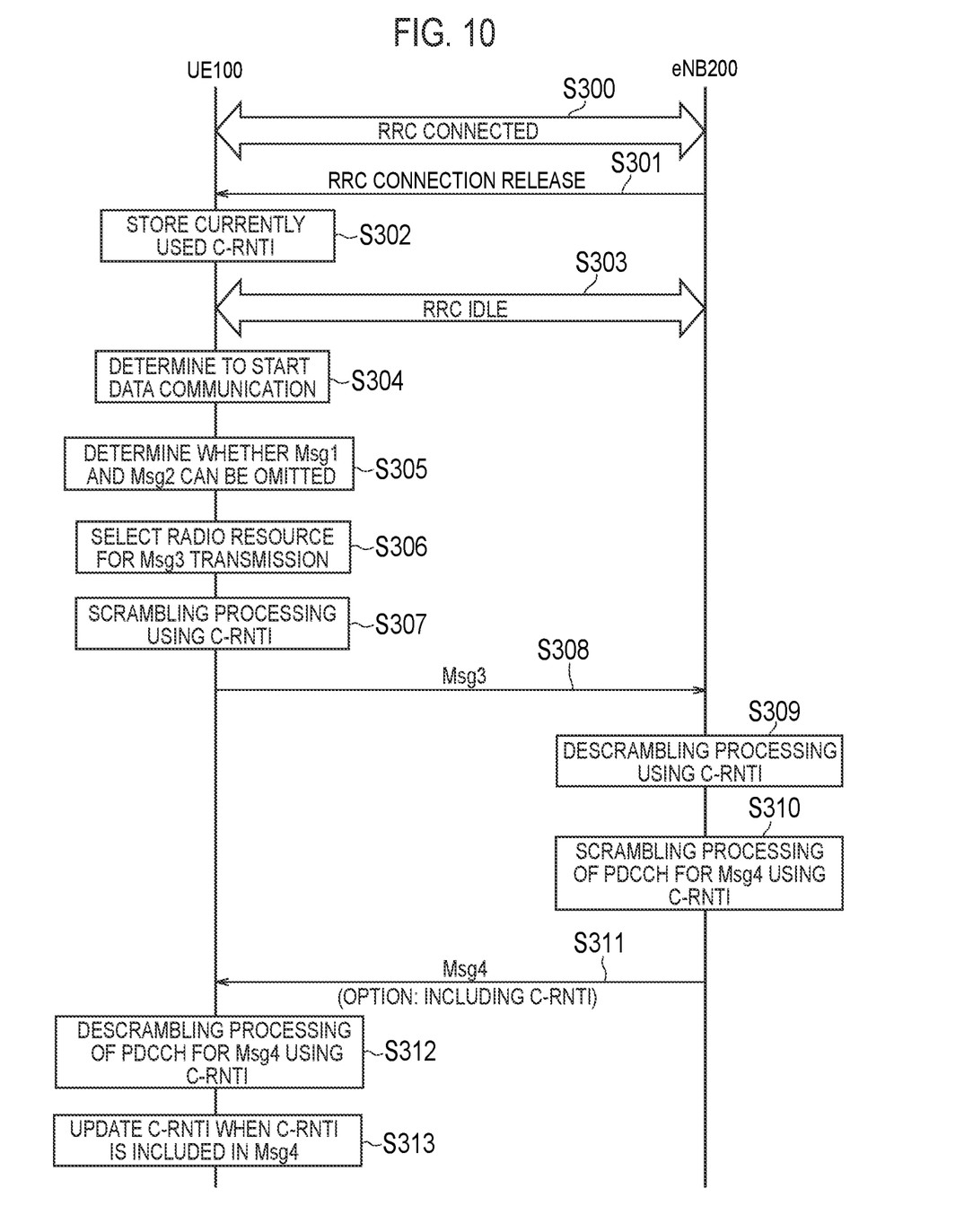
FIG. 10 is a diagram illustrating an operation example in a case of using the most recently allocated C-RNTI according to an embodiment.

FIG. 10 is a diagram illustrating an operation example in the case of using the most recently allocated C-RNTI. This operation example may be based on the UP solution of the EDT or may be based on the CP solution of the EDT. Herein, differences from the (A) case of using Resume ID discussed above are described and overlapping descriptions are omitted.

In the case of using the most recently allocated C-RNTI, the receiver 110 of the UE 100 receives the CRNTI allocated by the eNB 200 when the UE 100 transitions to the RRC connected mode. The controller 130 of the UE 100 performs communication with the eNB 200 using the allocated C-RNTI, and holds the C-RNTI while the UE 100 is in the RRC idle mode also after transitioning to the RRC idle mode from the RRC connected mode. The transmitter 120 of the UE 100 scrambles a bit sequence using the C-RNTI being held and transmits the scrambled bit sequence during the GFT procedure. Note that the UE 100 may hold the C-RNTI for a given period and discard/release the C-RNTI after the elapse of the given period.

In this way, in the case of using the most recently allocated C-RNTI, the C-RNTI that had been used before transitioning to the RRC idle mode is employed in the GFT procedure. Specifically, the UE 100 holds the C-RNTI while the UE 100 is in the RRC idle mode and uses the C-RNTI being held in the GFT procedure.

As illustrated in FIG. 10, step S300 is the same as the operation in the (A) case of using Resume ID described above.

In step S301, the transmitter 210 of the eNB 200 transmits, to the UE 100, an RRC Connection Release message including an indicator indicating that the currently allocated C-RNTI should be held. In addition to the indicator, a timer indicating an amount of time for which the C-RNTI should be held may be included in the RRC Connection Release message. Alternatively, instead of including the indicator, the UE 100 may be preconfigured to hold the C-RNTI for a certain period of time.

In step S302, the controller 130 of the UE 100 holds the current C-RNTI in response to the reception of the indicator indicating that the C-RNTI should be held. The controller 230 of the eNB 200 also holds the C-RNTI. If a timer is included in the RRC Connection Release message, the timer is activated and the controller 130 of the UE 100 holds the current C-RNTI until the timer is expired. The controller 230 of the eNB 200 manages this C-RNTI so that it is not allocated to other UEs 100.

For the operations in steps S303 to S313, the portion of Resume ID in the operations in the (A) case of using Resume ID described above can be read as the most recently allocated C-RNTI. Note that in step S308, the Msg3 may be an RRC Connection Request message instead of RRC Connection Resume Request message, and in step S311, the Msg4 may be an RRC Connection Setup message, an RRC Connection Reject message, or an RRC Connection Release message.

Summarization of the Embodiment

The UE 100 according to the present embodiment includes the receiver 110 which receives, from the eNB 200, an identifier which is allocated by the eNB 200 to the UE 100 by the time when UE 100 transitions from the RRC connected mode to the RRC idle mode at the latest, the controller 130 which holds the identifier while the UE 100 is in the RRC idle mode and which starts a procedure for transitioning from the RRC idle mode to the RRC connected mode, and the transmitter 120 which scrambles a bit sequence using the identifier being held and transmits the scrambled bit sequence to the eNB 200 during the procedure.

The eNB 200 according to the present embodiment includes the transmitter 210 which transmits, to the UE 100, an identifier allocated to the UE 100, the controller 230 which holds the identifier while the UE 100 is in the RRC idle mode, and the receiver 220 which receives a bit sequence from the UE 100 during a procedure for the UE 100 to transition from the RRC idle mode to the RRC connected mode and performs descrambling on the received bit sequence using the identifier being held.

This enables appropriate performance of uplink transmission (Msg3 transmission) by scrambling and descrambling a bit sequence using a previously held identifier even in the case where the need for the Msg1 and Msg2 in the random access procedure is eliminated and no Temporary C-RNTI is allocated to the radio terminal via Msg2 during the random access procedure.

Other Embodiments

The above embodiment mainly described the operations for the UE 100 to transition from the RRC idle mode to the RRC connected mode in the GFT procedure, but the present disclosure is not limited thereto. The UE 100 may maintain the RRC idle mode without transitioning to the RRC connected mode.

Alternatively, the UE 100 may start the GFT procedure in the RRC connected mode. In that case, the UE 100 may be allocated an identifier allocated exclusively for GFT (such as GFT-RNTI) by the eNB 200, rather than an already allocated C-RNTI. The identifier is set prior to starting of the GFT procedure. The identifier may be set by RRC Connection Reconfiguration. If the identifier is set, the UE 100 may determine that the eNB 200 has permitted the GFT procedure and start the GFT procedure. The operations according to the above-described embodiment may also be applied to such a GFT procedure that is started in the RRC connected mode. For example, the UE 100 may select a transmission resource using the identifier.

In the foregoing embodiments, an example in which radio terminals directed toward MTC and IoT (eMTC UEs and NB-IoT UEs) are used was described. However, the present disclosure is not limited to eMTC UEs and NB-IoT UEs. The operations according to the foregoing embodiments may also be applied to general UEs.

Although UEs that lie within enhanced coverage have been described, the present disclosure is not limited to this example. The operations according to the foregoing embodiments may also be applied to UEs that lie within normal coverage. More specifically, a CE level determination based on RSRP measurement need not be performed in a RACH procedure.

In the above-described embodiment, an example where the standby state is the RRC idle mode (specifically, suspend state) and the connected state is the RRC connected mode is described, but the present embodiment is not limited thereto. The connected state may be RRC light connection and the standby state may be INACTIVE state. The RRC light connection is one state of the RRC connected mode, and is a special state to which a part of the procedure of the RRC idle mode is applied. The INACTIVE is assumed to be introduced in the 5G mobile communication system, and is an RRC state different from the RRC connected mode and the RRC idle mode.

In the foregoing embodiments, an LTE system was illustrated as a mobile communications system. However, the present disclosure is not limited to an LTE system. The operations according to the foregoing embodiments may also be applied to a mobile communications system other than an LTE system (to a 5G mobile communications system, for example).

A program that causes a computer to execute each process executed by the UE 100 and the eNB 200 may also be provided. Furthermore, the program may also be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example. A chip set configured by a memory that stores a program for executing each process implemented by the UE 100 and eNB 200 and a processor that executes the program stored in the memory may also be provided.

Although the embodiments have been described in detail with reference to the drawings, the specific configuration is not limited to the above, and various design changes and the like can be made without departing from the gist.

The invention claimed is:

1. A user equipment comprising:
a receiver configured to receive an RRC (Radio Resource Control) Release message when the user equipment is in a RRC connected state, the RRC Release message including information indicating an uplink radio resource used for transmitting uplink data from the user equipment in an RRC inactive state,
a controller configured to, in response to receiving the RRC Release message, control the user equipment to transition from the RRC connected state to the RRC inactive state, and
a transmitter configured to, without transmission of a random access signal and reception of a random access response, transmit the uplink data by using the uplink radio resource indicated by the information included in the RRC Release message when the user equipment is in the RRC inactive state.

2. A method used in a user equipment comprising:
receiving an RRC (Radio Resource Control) Release message when the user equipment is in an RRC connected state, the RRC Release message including information indicating an uplink radio resource used for transmitting uplink data from the user equipment in an RRC inactive state;
in response to receiving the RRC Release message, controlling the user equipment to transition from the RRC connected state to the RRC inactive state; and
transmitting, without transmission of a random access signal and reception of a random access response, the uplink data by using the uplink radio resource indicated by the information included in the RRC Release message when the user equipment is in the RRC inactive state.

3. An apparatus controlling a user equipment, the apparatus comprising a processor and a memory coupled to the processor, the processor configured to
receive an RRC (Radio Resource Control) Release message when the user equipment is in an RRC connected state, the RRC Release message including information indicating an uplink radio resource used for transmitting uplink data from the user equipment in an RRC inactive state,
in response to receiving the RRC Release message, control the user equipment to transition from the RRC connected state to the RRC inactive state, and
transmit, without transmission of a random access signal and reception of a random access response, the uplink data by using the uplink radio resource indicated by the information included in the RRC Release message when the user equipment is in the RRC inactive state.

* * * * *